(12) United States Patent
Nagahara (10) Patent No.: US 7,961,142 B2
(45) Date of Patent: Jun. 14, 2011

(54) PRESENT POSITION LOCATING METHOD, POSITIONING DEVICE, AND ELECTRONIC INSTRUMENT

(75) Inventor: Mikio Nagahara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 321 days.

(21) Appl. No.: 12/062,117

(22) Filed: Apr. 3, 2008

(65) Prior Publication Data

US 2008/0246660 A1 Oct. 9, 2008

(30) Foreign Application Priority Data

Apr. 9, 2007 (JP) ................................. 2007-101476
Feb. 19, 2008 (JP) ................................. 2008-037114

(51) Int. Cl.
*G01S 19/42* (2010.01)
(52) U.S. Cl. ................................................. 342/357.25
(58) Field of Classification Search .. 42/357.01–357.17; 342/357.01–357.17, 357.2–357.78
See application file for complete search history.

(56) References Cited

U.S. PATENT DOCUMENTS

| 7,501,981 B2 * | 3/2009 | Rahman et al. .......... 342/357.02 |
| 2007/0109185 A1 * | 5/2007 | Kracke et al. ............ 342/357.09 |
| 2007/0247358 A1 * | 10/2007 | Alanen et al. ............ 342/357.06 |
| 2008/0074317 A1 * | 3/2008 | Harper et al. ............ 342/357.02 |
| 2009/0002234 A1 * | 1/2009 | Normark et al. ......... 342/357.15 |

FOREIGN PATENT DOCUMENTS

JP 2006-090839 A 4/2006

* cited by examiner

*Primary Examiner* — Thomas H Tarcza
*Assistant Examiner* — Nga X Nguyen
(74) *Attorney, Agent, or Firm* — Global IP Counselors, LLP (57) ABSTRACT

Estimation calculations for calculating an estimated present position are performed twice corresponding to each satellite set. The estimated present position calculated by the second estimation calculations is determined to be a present position candidate corresponding to the target satellite set. In the first estimation calculations corresponding to the first satellite set, the calculated satellite position and estimated pseudo-range of each GPS satellite are stored in caches. In the second estimation calculations, the satellite position of each GPS satellite is read from the cache. In the first estimation calculations corresponding to the second or subsequent satellite set, the satellite position and the estimated pseudo-range of each GPS satellite are read from the caches, and the satellite position and the estimated pseudo-range of the GPS satellite of which the satellite position and the estimated pseudo-range have not been stored in the caches are calculated and stored in the caches. In the second estimation calculations, the satellite position of each GPS satellite is read from the cache.

3 Claims, 7 Drawing Sheets

SATELLITE SET DATA

| SATELLITE SETS | GPS SATELLITE | PRESENT POSITION CANDIDATE | EVALUATION POINT |
|---|---|---|---|
| A | #1, #2, #3, #4 | Pa(xa, ya, za) | 1.2 |
| B | #1, #2, #3, #5 | Pb(xb, yb, zb) | 1.9 |
| C | #1, #2, #3, #6 | Pc(xc, yc, zc) | 0.4 |
| ⋮ | ⋮ | ⋮ | ⋮ |

PRESENT POSITION LOCATING METHOD, POSITIONING DEVICE, AND ELECTRONIC INSTRUMENT

Japanese Patent Application No. 2007-101476 filed on Apr. 9, 2007 and Japanese Patent Application No. 2008-37114 filed on Feb. 19, 2008, are hereby incorporated by reference in their entirety.

BACKGROUND OF THE INVENTION

The present invention relates to a present position locating method, a positioning device, and an electronic instrument.

The global positioning system (GPS) is widely known as a satellite positioning system, and is utilized for a car navigation system and the like. In the GPS, GPS satellite signals are respectively transmitted from a plurality of GPS satellites which orbit the earth, and a GPS receiver calculates (locates) its present position based on the received GPS satellite signals.

The GPS receiver generally calculates its position as follows. Specifically, the GPS receiver generates satellite sets (i.e., combinations of four or more GPS satellites) based on the acquired GPS satellite signals, and performs positioning calculations corresponding to each satellite set to calculate the present position of the GPS receiver. The GPS receiver selects the present position considered to have the highest accuracy from the present positions calculated corresponding to the satellite sets based on an index such as a position dilution of precision (PDOP), and determines the selected present position to be the present positioning result.

When calculating the present position corresponding to each satellite set, an estimated positioning accuracy decrease rate may be calculated corresponding to each satellite set before positioning. A satellite set considered to have the highest positioning accuracy (i.e., the lowest estimated positioning accuracy decrease rate) may be initially acquired based on the estimated positioning accuracy decrease rate to locate a position. The term "estimated positioning accuracy decrease rate" refers to an index specified by the constellation of GPS satellites. The estimated positioning accuracy decrease rate decreases as the extent of the constellation of GPS satellites increases. This is because the positioning accuracy tends to increase as the extent of the constellation of GPS satellites increases. This method is considered to be effective for accurately locating a position when a long period of time has elapsed after the preceding positioning (see JP-A-2006-90839, for example).

A method which calculates the present position by performing positioning calculations corresponding to each of a plurality of GPS satellite sets takes time for positioning. For example, the period of time required for positioning increases in proportion to the number of satellite sets. In recent years, a portable electronic instrument (e.g., portable telephone or wristwatch) has been provided with a GPS function. Since a portable GPS receiver is normally utilized during travel, the GPS receiver must locate its present position within a predetermined time limit (e.g., at intervals of one second).

SUMMARY

According to one aspect of the invention, there is provided a present position locating method comprising:

selecting a plurality of satellite sets, each of the plurality of satellite sets being a combination of satellites;

calculating present position candidates respectively corresponding to the plurality of satellite sets using satellite signals from satellites respectively included in the plurality of satellite sets; and selecting a present position candidate from the present position candidates respectively corresponding to the plurality of satellite sets, and determining the selected present position candidate to be a present located position, the calculating of the present position candidates respectively corresponding to the plurality of satellite sets including:

reading positions of the respective satellites of a target satellite set among the plurality of satellite sets from a satellite position storage section that stores positions of the respective satellites, and calculating a position of a satellite of the target satellite set that is not stored in the satellite position storage section in terms of its position based on the satellite signal from that satellite and storing the calculated position in the satellite position storage section; and acquiring estimated pseudo-ranges that are pseudo-ranges between a temporary present position and the respective satellites of the target satellite set; and the present position candidate corresponding to the target satellite set being calculated using the temporary present position and the positions and the estimated pseudo-ranges of the respective satellites of the target satellite set as initial values.

DETAILED DESCRIPTION OF THE EMBODIMENT

Embodiments of the invention may reduce the number of calculations required for located position calculations when performing positioning calculations corresponding to each of a plurality of satellite sets during one positioning process.

According to one embodiment of the invention, there is provided a present position locating method used when receiving satellite signals transmitted from positioning satellites and repeating present position positioning calculations based on the received satellite signals, the method comprising:

selecting satellite sets based on the received satellite signals, each of the satellite sets being a combination of satellites used for present positioning calculations;

calculating present position candidates corresponding to the respective selected satellite sets using the satellite signals from the satellites included in the respective selected satellite sets; and selecting a present position candidate from the present position candidates calculated corresponding to the respective satellite sets, and determining the selected present position candidate to be a present located position, the calculating of the present position candidates including:

setting a temporary present position;

reading positions of the satellites of a target satellite set among the satellite sets from a satellite position storage section that stores positions of the respective satellites, and calculating a position of a satellite of the target satellite set that is not stored in the satellite position storage section in terms of its position based on the satellite signal received from that satellite and storing the calculated position in the satellite position storage section; and acquiring estimated pseudo-ranges that are pseudo-ranges between the set temporary present position and the respective satellites; and the present position candidate corresponding to the target satellite set being calculated by repeating given estimation calculations using the set temporary present position and the acquired positions and the acquired estimated pseudo-ranges of the respective satellites of the target satellite set as initial values.

According to another embodiment of the invention, there is provided a positioning device that receives satellite signals transmitted from positioning satellites and repeats present position positioning calculations based on the received satellite signals, the positioning device comprising:

a satellite set selection section that selects satellite sets based on the received satellite signals, each of the satellite sets being a combination of satellites used for present positioning calculations;

an individual satellite set present position calculation section that calculates present position candidates corresponding to the respective selected satellite sets using the satellite signals from the satellites included in the respective selected satellite sets; and a present position determination section that selects a present position candidate from the present position candidates calculated corresponding to the respective satellite sets, and determines the selected present position candidate to be a present located position, the individual satellite set present position calculation section including:

a temporary present position setting section that sets a temporary present position;

a satellite position acquisition section that reads positions of the satellites of a target satellite set among the satellite sets from a satellite position storage section that stores positions of the respective satellites, and calculating a position of a satellite of the target satellite set that is not stored in the satellite position storage section in terms of its position based on the satellite signal received from that satellite and storing the calculated position in the satellite position storage section; and an estimated pseudo-range acquisition section that acquires estimated pseudo-ranges that are pseudo-ranges between the set temporary present position and the respective satellites; and the individual satellite set present position calculation section calculating the present position candidate corresponding to the target satellite set by repeating given estimation calculations using the set temporary present position and the acquired positions and the acquired estimated pseudo-ranges of the respective satellites of the target satellite set as initial values.

According to the above configuration, the present position candidate corresponding to each satellite set selected based on the received satellite signals is calculated by performing given estimation calculations using the temporary present position and the position and the estimated pseudo-range of each satellite of the target satellite set as initial values. The position of each satellite is read from the satellite position storage section which stores the position of each satellite. The position of the satellite of which the position has not been stored in the satellite position storage section is calculated based on the satellite signal received from that satellite and stored in the satellite position storage section. A single satellite may be included in different satellite sets. In this case, the position of each satellite is the same irrespective of the satellite set in which the satellite is included. Therefore, if the calculated position of each satellite is stored in the satellite position storage section, the position of the satellite of which the position has been calculated can be read from the satellite position storage section without again calculating the position of the satellite. This prevents a situation in which the same calculation is performed a plurality of times, whereby the number of calculations required for located position calculations can be reduced.

According to another embodiment of the invention, there is provided a present position locating method comprising:

selecting a plurality of satellite sets, each of the plurality of satellite sets being a combination of satellites;

calculating present position candidates respectively corresponding to the plurality of satellite sets using satellite signals from satellites respectively included in the plurality of satellite sets; and selecting a present position candidate from the present position candidates respectively corresponding to the plurality of satellite sets, and determining the selected present position candidate to be a present located position, the calculating of the present position candidates respectively corresponding to the plurality of satellite sets including:

reading positions of the respective satellites of a target satellite set among the plurality of satellite sets from a satellite position storage section that stores positions of the respective satellites, and calculating a position of a satellite of the target satellite set that is not stored in the satellite position storage section in terms of its position based on the satellite signal from that satellite and storing the calculated position in the satellite position storage section; and acquiring estimated pseudo-ranges that are pseudo-ranges between a temporary present position and the respective satellites of the target satellite set; and the present position candidate corresponding to the target satellite set being calculated using the temporary present position and the positions and the estimated pseudo-ranges of the respective satellites of the target satellite set as initial values.

According to another embodiment of the invention, there is provided a positioning device comprising:

a satellite set selection section that selects a plurality of satellite sets, each of the plurality of satellite sets being a combination of satellites;

an individual satellite set present position calculation section that calculates present position candidates respectively corresponding to the plurality of satellite sets using satellite signals from satellites respectively included in the plurality of satellite sets; and a present position determination section that selects a present position candidate from the present position candidates respectively corresponding to the plurality of satellite sets, and determines the selected present position candidate to be a present located position, the individual satellite set present position calculation section including:

a satellite position acquisition section that reads positions of the respective satellites of a target satellite set among the plurality of satellite sets from a satellite position storage section that stores positions of the respective satellites, and calculating a position of a satellite of the target satellite set that is not stored in the satellite position storage section in terms of its position based on the satellite signal from that satellite and storing the calculated position in the satellite position storage section; and an estimated pseudo-range acquisition section that acquires estimated pseudo-ranges that are pseudo-ranges between a temporary present position and the respective satellites of the target satellite set; and the individual satellite set present position calculation section calculating the present position candidate corresponding to the target satellite set using the temporary present position and the positions and the estimated pseudo-ranges of the respective satellites of the target satellite set as initial values.

In the present position locating method according to this embodiment, the setting of the temporary present position may include setting a preceding located position to be the temporary present position during first estimation calculations of the given estimation calculations performed corresponding to the target satellite set, and setting an estimated present position calculated by the preceding estimation calculations to be the temporary present position during second or subsequent estimation calculations; and the acquiring of the estimated pseudo-ranges may include:

reading the estimated pseudo-ranges of the respective satellites of the target satellite set from an estimated pseudo-range storage section that stores estimated pseudo-ranges of the respective satellites during the first estimation calculations of the given estimation calculations performed corresponding to the target satellite set, and calculating an estimated pseudo-range of a satellite that is not stored in the estimated pseudo-range storage section in terms of its estimated pseudo-range based on the acquired position of that satellite and the set temporary present position and storing the calculated estimated pseudo-range in the estimated pseudo-range storage section; and calculating the estimated pseudo-ranges of the respective satellites of the target satellite set based on the set temporary present position and the acquired positions of the respective satellites of the target satellite set during the second or subsequent estimation calculations of the given estimation calculations performed corresponding to the target satellite set.

In the positioning device according to this embodiment, the temporary present position setting section may set a preceding located position to be the temporary present position during first estimation calculations of the given estimation calculations performed corresponding to the target satellite set, and may set an estimated present position calculated by the preceding estimation calculations to be the temporary present position during second or subsequent estimation calculations; and the estimated pseudo-range acquisition section may include:

a first acquisition section that reads the estimated pseudo-ranges of the respective satellites of the target satellite set from an estimated pseudo-range storage section that stores estimated pseudo-ranges of the respective satellites during the first estimation calculations of the given estimation calculations performed corresponding to the target satellite set, and calculating an estimated pseudo-range of a satellite that is not stored in the estimated pseudo-range storage section in terms of its estimated pseudo-range based on the acquired position of that satellite and the set temporary present position and storing the calculated estimated pseudo-range in the estimated pseudo-range storage section; and a second or subsequent acquisition section that calculates the estimated pseudo-ranges of the respective satellites of the target satellite set based on the set temporary present position and the acquired positions of the respective satellites of the target satellite set during the second or subsequent estimation calculations of the given estimation calculations performed corresponding to the target satellite set.

According to the above configuration, the preceding located position is set to be the temporary present position during the first estimation calculations of the given estimation calculations performed corresponding to each satellite set. The estimated pseudo-range of each satellite is read from the estimated pseudo-range storage section that stores the estimated pseudo-range of each satellites. The estimated pseudo-range of the satellite of which the estimated pseudo-range is not stored in the estimated pseudo-range storage section is calculated based on the position of the satellite and the temporary present position, and stored in the estimated pseudo-range storage section. During the second or subsequent estimation calculations, the estimated present position calculated by the preceding estimation calculations is set to be the temporary present position, and the estimated pseudo-range of each satellite is calculated based on the position of each satellite and the temporary present position. The estimated pseudo-range of each satellite is the same irrespective of the satellite set in which the satellite is included insofar as the position of the satellite and the temporary present position are the same. Specifically, the estimated pseudo-range of each satellite is the same irrespective of the satellite set in which the satellite is included during the first estimation calculations in which the temporary present position is the same (preceding located position) for each satellite set. Therefore, if the calculated estimated pseudo-range of each satellite is stored in the estimated pseudo-range storage section, the estimated pseudo-range of the satellite of which the estimated pseudo-range has been calculated can be read from the estimated pseudo-range storage section during the first estimation calculations without calculating the estimated pseudo-range. This prevents a situation in which the same calculation is performed a plurality of times, whereby the number of calculations required for located position calculations can be further reduced.

Another embodiment of the invention relates to a computer-readable storage medium storing a program that causes a computer to execute the above present position locating method, the computer being included in a positioning device that receives satellite signals transmitted from positioning satellites and locates a present position of the positioning device based on the received satellite signals.

The term "storage medium" used herein refers to a storage medium (e.g., hard disk, CD-ROM, DVD, memory card, or IC memory) from which information stored therein can be read by a computer.

A further embodiment of the invention relates to an electronic instrument comprising the above positioning device.

Preferred embodiments of the invention are described in detail below with reference to the drawings.

The following embodiments illustrate specific preferred examples of the invention, and are provided with various technologically preferred limitations. Note that the scope of the invention is not limited to the following embodiments unless there is a description which limits the invention.

An embodiment in which the invention is applied to a portable telephone including a positioning device is described below with reference to the drawings.

Figure 1:
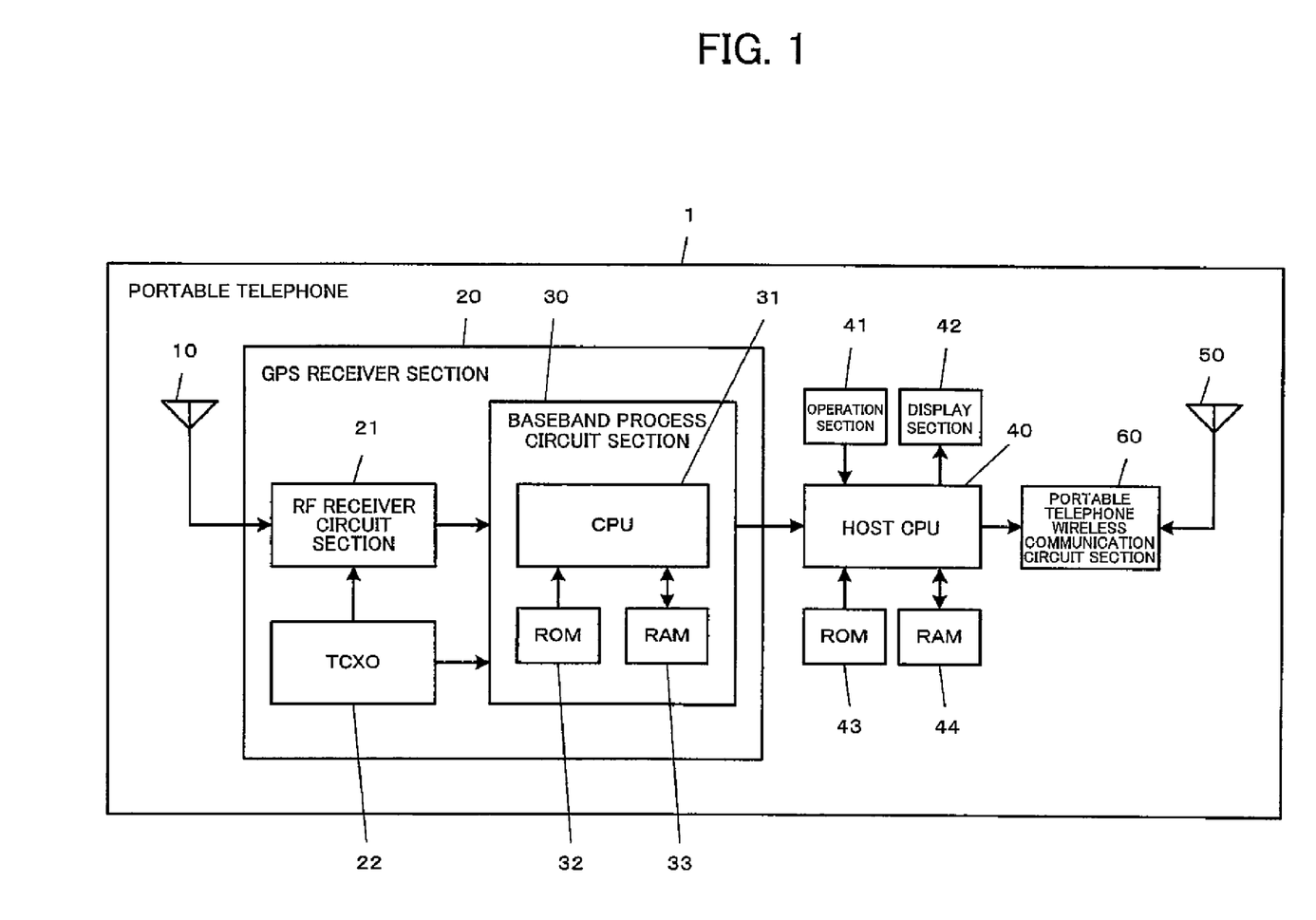
FIG. 1 is an internal configuration diagram of a portable telephone.

FIG. 1 is a block diagram showing the internal configuration of a portable telephone 1 according to this embodiment. As shown in FIG. 1, the portable telephone 1 includes a GPS antenna 10, a GPS receiver section 20 (positioning device), a host central processing unit (CPU) 40, an operation section 41, a display section 42, a read-only memory (ROM) 43, a random access memory (RAM) 44, a portable telephone antenna 50, and a portable telephone wireless communication circuit section 60.

The GPS antenna 10 is an antenna which receives an RF signal including a GPS satellite signal transmitted from a GPS satellite, and outputs the received RF signal.

The GPS receiver section 20 acquires/extracts the GPS satellite signal from the RF signal received by the GPS antenna 10, and calculates the present position of the portable telephone 1 by performing positioning calculations based on a navigation message and the like extracted from the GPS satellite signal. The GPS receiver section 20 includes a radio frequency (RF) receiver circuit section 21, a temperature-controlled crystal oscillator (TCXO) 22, and a baseband process circuit section 30. The RF receiver circuit section 21 and the baseband process circuit section 30 may be produced as different large scale integrated (LSI) circuits, or may be produced in one chip.

The TCXO 22 is a temperature-controlled crystal oscillator which generates and outputs an oscillation signal having a given oscillation frequency.

The RF receiver circuit section 21 multiplies the RF signal input from the GPS antenna 10 by a signal obtained by dividing or multiplying the frequency of the oscillation signal input from the TCXO 22 to down-convert the RF signal into an intermediate-frequency signal (hereinafter referred to as "IF signal"). The RF receiver circuit section 21 amplifies the IF signal, converts the amplified signal into a digital signal using an A/D converter, and outputs the digital signal, for example.

The baseband process circuit section 30 is a circuit section which acquires/tracks the GPS satellite signal from the IF signal input from the RF receiver circuit section 21, and performs pseudo-range calculations, positioning calculations, and the like based on a navigation message, time information, and the like extracted by decoding data.

Specifically, the baseband process circuit section 30 acquires the GPS satellite signal based on the input IF signal. The baseband process circuit section 30 acquires the GPS satellite signal by extracting the GPS satellite signal from the IF signal by performing a correlation process on the IF signal. Specifically, the baseband process circuit section 30 performs a coherent process which calculates the correlation between the IF signal and a pseudo-generated C/A code replica (code replica) using FFT calculations, and then performs an incoherent process which integrates the correlation values (i.e., results of the coherent process) to calculate an integrated correlation value. As a result, the phases of the C/A code and a carrier frequency contained in the GPS satellite signal are obtained.

After acquiring the GPS satellite signal, the baseband process circuit section 30 tracks the acquired GPS satellite signal. The baseband process circuit section 30 tracks the GPS satellite signals by synchronously holding a plurality of acquired GPS satellite signals in parallel. For example, the baseband process circuit section 30 performs a code loop which is implemented by a delay locked loop (DLL) and tracks the phase of the C/A code, and a carrier loop which is implemented by a phase locked loop (PLL) and tracks the phase of the carrier frequency. The baseband process circuit section 30 extracts the navigation message by decoding data contained in each GPS satellite signal which has been tracked, and performs pseudo-range calculations, positioning calculations, and the like to locate the present position of the portable telephone 1.

The baseband process circuit section 30 includes a CPU 31, a ROM 32, and a RAM 33. The baseband process circuit section 30 also includes various circuits such as a C/A code replica generation circuit, a correlation calculation circuit, and a data decoder circuit.

The CPU 31 controls each section of the baseband process circuit section 30 and the RF receiver circuit section 21, and performs various calculations including a baseband process described later.

In the baseband process, the CPU 31 calculates the pseudo-range between the portable telephone 1 and each acquired GPS satellite based on orbit information and time information relating to each GPS satellite included in the navigation message decoded from the acquired/tracked GPS satellite signal, and performs positioning calculations based on the calculated pseudo-range to calculate the present position of the portable telephone 1.

Figure 2:
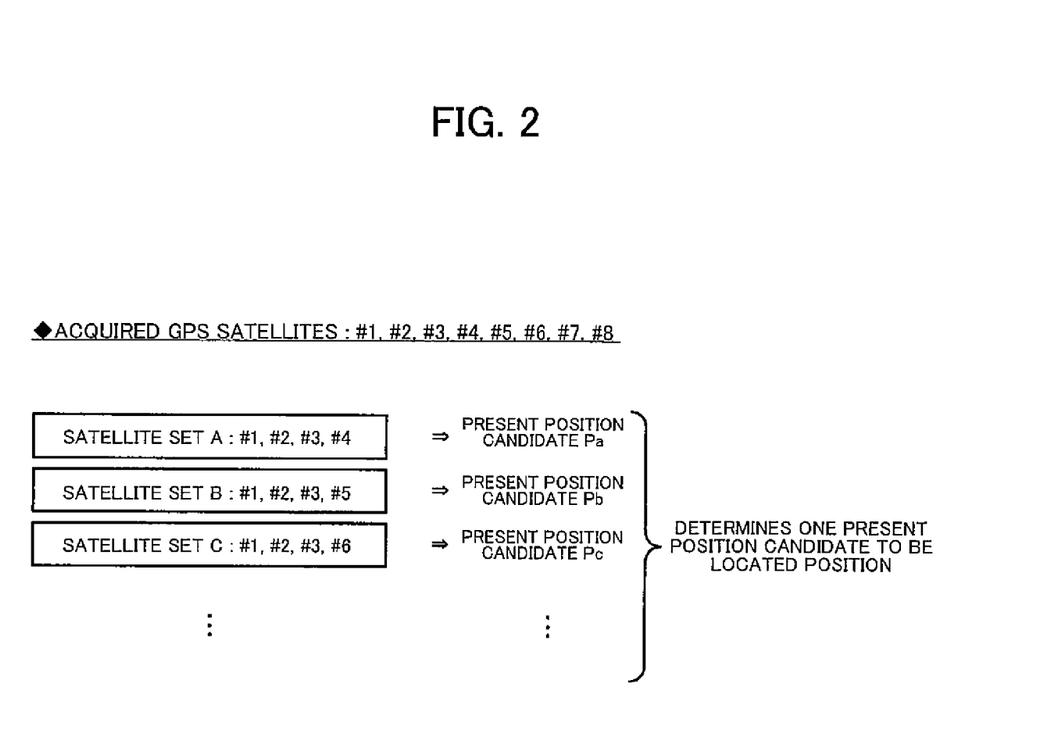
FIG. 2 is a schematic view showing determination of a located position.

FIG. 2 is a view illustrative of an outline of present position calculations (positioning) performed by the CPU 31. The CPU 31 generates satellite sets (i.e., combinations of four or more GPS satellites) based on the acquired GPS satellite signals. For example, when eight GPS satellite signals have been acquired, the CPU 31 generates 163 (=8C8+8C7+8C6+8C5+8C4) satellite sets. The CPU 31 then performs positioning calculations corresponding to each satellite set using a least-square method to calculate present position candidates P of the portable telephone 1.

The CPU 31 selects one present position candidate from the present position candidates corresponding to the respective satellite sets based on a given criterion, for example, and determines the selected present position candidate to be the present located position of the portable telephone 1. As the criterion, a position dilution of precision (PDOP) based on the constellation of the GPS satellites of the target satellite set, or the signal strength of each GPS satellite signal may be used, for example. The located position thus determined is output to the host CPU 40 in the subsequent stage.

Figure 3:
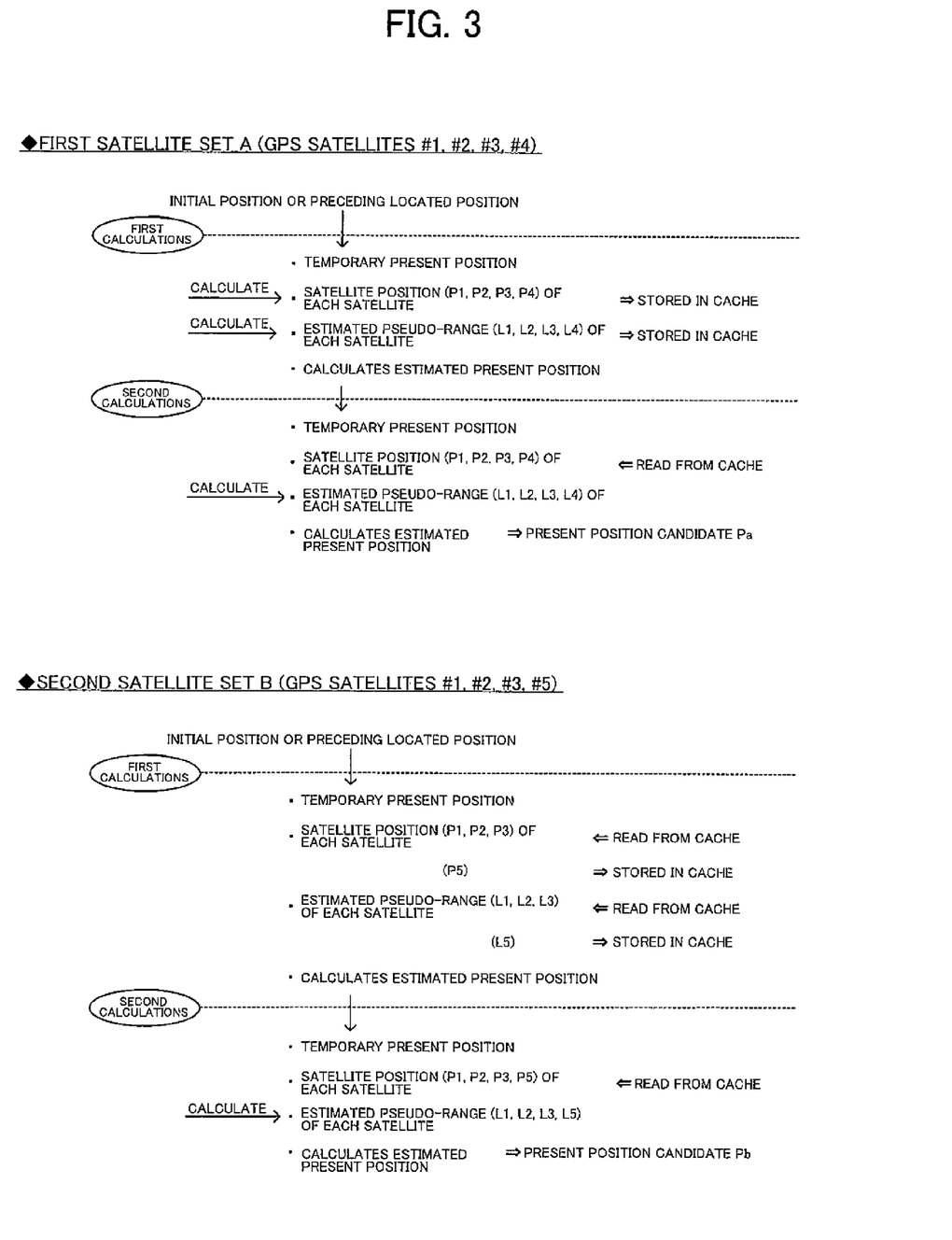
FIG. 3 is a view illustrative of calculations of a present position candidate corresponding to each satellite set.

FIG. 3 is a view illustrative of located position calculations performed by the CPU 31 in detail. FIG. 3 shows one positioning process. In this embodiment, the present position (estimated present position) of the portable telephone 1 is calculated (estimation calculations) twice using a least-square method corresponding to each satellite set. The estimated present position calculated by the second estimation calculations is determined to be the present position candidate corresponding to the target satellite set. A method of calculating the present position candidate P differs between the first satellite set and the second or subsequent satellite set.

A method of calculating the present position candidate P corresponding to the first satellite set is as follows. The first satellite set is referred to as a satellite set A made up of four GPS satellites #1 to #4. In the first estimation calculations, the preceding located position or a given initial position is used as a temporary present position of the portable telephone 1. The position (satellite position) of each GPS satellite of the target satellite set is calculated based on the GPS satellite signal from that GPS satellite, and the calculated satellite position of each GPS satellite is stored in a satellite position cache. Specifically, satellite positions P1 to P4 of the GPS satellites #1 to #4 are calculated and stored in the satellite position cache. The pseudo-range (estimated pseudo-range) between the temporary present position of the portable telephone 1 and each GPS satellite of the target satellite set is calculated, and the calculated estimated pseudo-range of each GPS satellite is stored in an estimated pseudo-range cache. Specifically, estimated pseudo-ranges L1 to L4 of the GPS satellites #1 to #4 are calculated and stored in the estimated pseudo-range cache. The present position (estimated present position) of the portable telephone 1 is calculated by performing estimation calculations using a least-square method utilizing the temporary present position and the satellite position and the estimated pseudo-range of each GPS satellite of the target satellite set as initial values.

The second estimation calculations are then performed. In the second estimation calculations, the estimated present position calculated by the first estimation calculations is used as the temporary present position of the portable telephone 1. The satellite position of each GPS satellite of the target satellite set is read from the satellite position cache. Specifically, the satellite positions PI to P4 of the GPS satellites #1 to #4 are read from the satellite position cache. The estimated pseudo-range of each GPS satellite of the target satellite set is then calculated. Specifically, the estimated pseudo-ranges of the GPS satellites #1 to #4 are calculated. Since the temporary present position used in the second estimation calculations differs from the temporary present position used in the first estimation calculations, the estimated pseudo-range of each of the GPS satellites #1 to #4 is calculated. Estimation calculations are then performed using a least-square method utilizing the temporary present position and the satellite position and the estimated pseudo-range of each GPS satellite as initial values. The estimated present position calculated by the second estimation calculations is determined to be the present position candidate corresponding to the target satellite set (first satellite set A).

A method of calculating the present position candidate P corresponding to the second satellite set is as follows. The second satellite set is referred to as a satellite set B made up of four GPS satellites #1 to #3 and #5. In the first estimation calculations, the preceding located position or a given initial position is used as the temporary present position of the portable telephone 1 in the same manner as for the first satellite set. The satellite position of each GPS satellite of the target satellite set is acquired. Specifically, the satellite position of the GPS satellite of which the satellite position has been stored in the satellite position cache is acquired from the satellite position cache. The satellite position of the GPS satellite of which the satellite position has not been stored in the satellite position cache is calculated based on the GPS satellite signal from that GPS satellite, and stored in the satellite position cache. Specifically, the satellite positions PI to P3 of the satellites #1 to #3 are read from the satellite position cache, and a satellite position P5 of the GPS satellite #5 is calculated and stored in the satellite position cache. Specifically, the satellite positions P1 to P5 of the satellites #1 to #5 are stored in the satellite position cache.

The estimated pseudo-range of each GPS satellite of the target satellite set is also acquired. Specifically, the estimated pseudo-range of the GPS satellite of which the estimated pseudo-range has been stored in the estimated pseudo-range cache is acquired from the estimated pseudo-range cache. The estimated pseudo-range of the GPS satellite of which the estimated pseudo-range has not been stored in the estimated pseudo-range cache is calculated and stored in the estimated pseudo-range cache. Specifically, the estimated pseudo-ranges L1 to L3 of the GPS satellites #1 to #3 are read from the estimated pseudo-range cache, and an estimated pseudo-range of the GPS satellite #5 is calculated and stored in the estimated pseudo-range cache. Specifically, the estimated pseudo-ranges L1 to L5 of the GPS satellites #1 to #5 are stored in the estimated pseudo-range cache. The estimated present position of the portable telephone 1 is calculated by performing estimation calculations using a least-square method utilizing the temporary present position and the satellite position and the estimated pseudo-range of each GPS satellite as initial values.

In the second estimation calculations, the estimated present position calculated by the first estimation calculations is used as the temporary present position of the portable telephone 1. The satellite position of each GPS satellite is acquired from the satellite position cache. Specifically, the satellite positions P1 to P3 and P5 of the GPS satellites #1 to #3 and #5 are read from the satellite position cache. The estimated pseudo-range of each GPS satellite is calculated. Specifically, the estimated pseudo-ranges L1 to L3 and L5 of the GPS satellites #1 to #3 and #5 are calculated. The estimated present position of the portable telephone 1 is calculated by performing estimation calculations using a least-square method utilizing the temporary present position and the satellite position and the estimated pseudo-range of each GPS satellite as initial values.

The present position candidate corresponding to the third or subsequent satellite set is calculated in the same manner as for the second satellite set. According to this embodiment, the position (satellite position) and the pseudo-range (estimated pseudo-range) of each GPS satellite stored in the caches are read from the caches in the respective estimation calculations so that identical calculations need not be performed a plurality of times, whereby the number of calculations is reduced.

Figure 4:
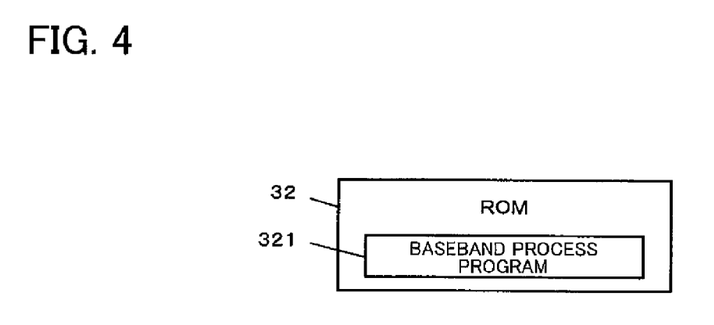
FIG. 4 is a configuration diagram of a ROM.

Again referring to FIG. 1, the ROM 32 stores a system program which causes the CPU 31 to control each section of the baseband process circuit section 30 and the RF receiver circuit section 21, and a program and data necessary for the CPU 31 to implement various processes including the baseband process. FIG. 4 is a view showing the configuration of the ROM 32. As shown in FIG. 4, the ROM 32 stores a baseband process program 321.

Figure 5:
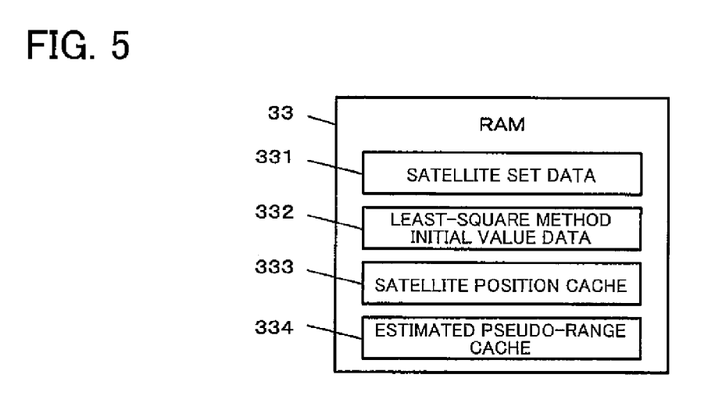
FIG. 5 is a configuration diagram of a RAM.

The RAM 33 is used as a work area for the CPU 31, and temporarily stores a program and data read from the ROM 32, results of calculations performed by the CPU 31 based on various programs, and the like. FIG. 5 is a view showing the configuration of the RAM 33. As shown in FIG. 5, the RAM 33 stores satellite set data 331 and least-square method initial value data 332. A satellite position cache 333 and an estimated pseudo-range cache 334 are formed in the RAM 33 as data storage areas.

Figure 6:
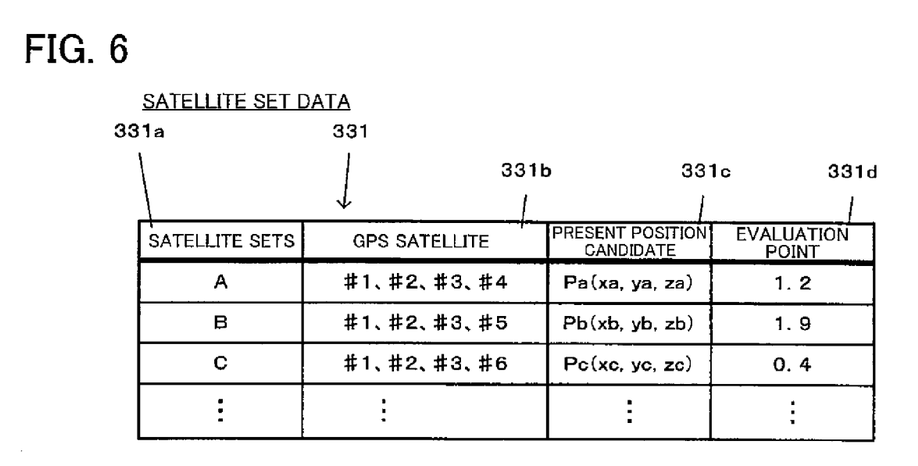
FIG. 6 shows a data configuration example of satellite set data.

The satellite set data 331 is data relating to the satellite sets generated based on the acquired GPS satellite signals. FIG. 6 shows an example of the data configuration of the satellite set data 331. As shown in FIG. 6, a GPS satellite 331b, a present position candidate 331c, and an evaluation point 331d are stored as the satellite set data 331 corresponding to each satellite set 331a generated.

Figure 7:
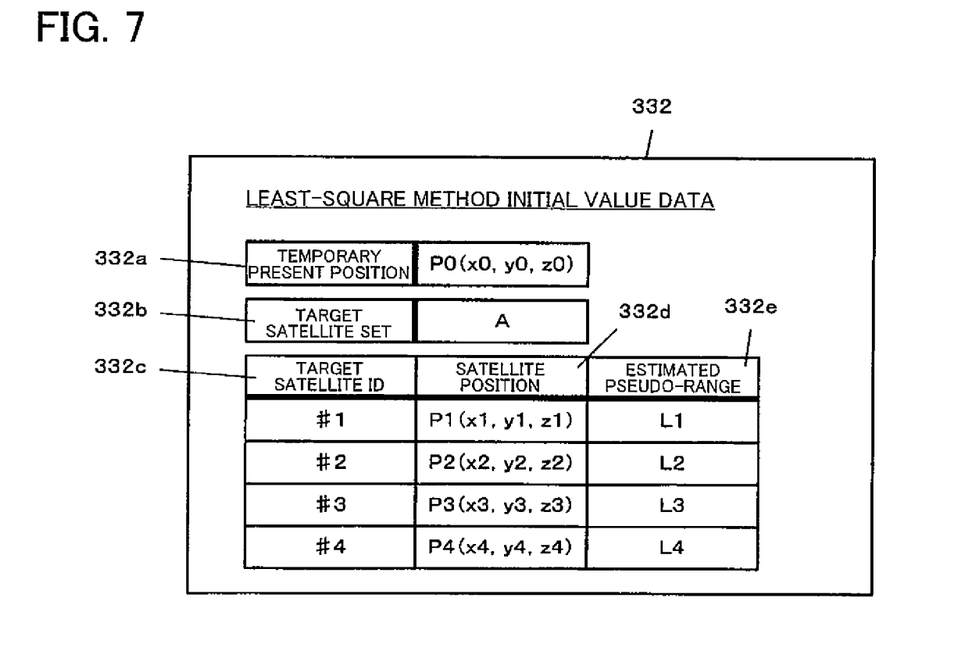
FIG. 7 shows a data configuration example of least-square method initial value data.

The least-square method initial value data 332 is data relating to the initial values used in estimation calculations using a least-square method. FIG. 7 shows an example of the data configuration of the least-square method initial value data 332. As shown in FIG. 7, a temporary present position 332a of the portable telephone 1 and a target satellite set 332b are stored as the least-square method initial value data 332. A satellite ID 332c, a satellite position 332d, and an estimated pseudo-range 332e are also stored as the least-square method initial value data 332 corresponding to each GPS satellite included in the target satellite set.

Figure 8:
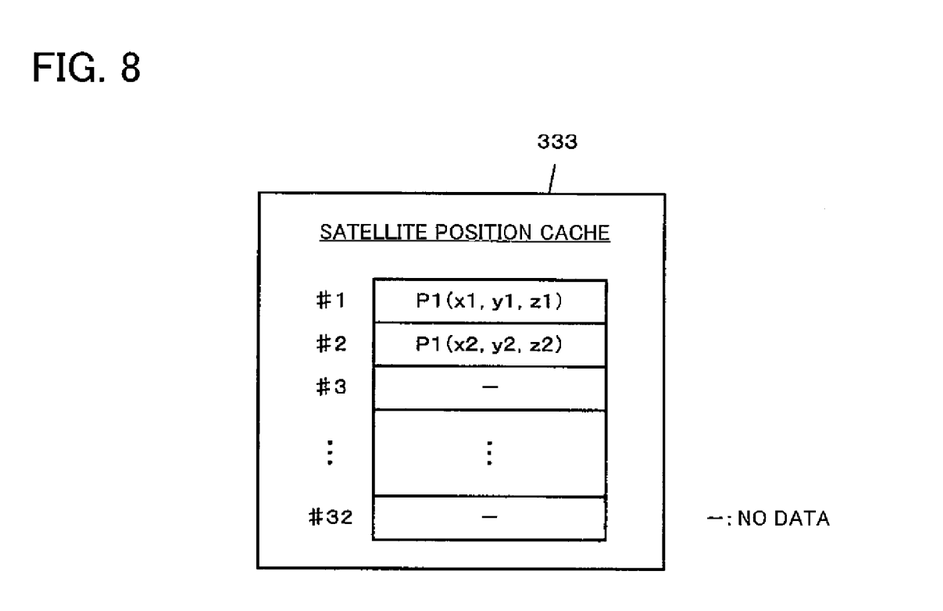
FIG. 8 shows a configuration example of a satellite position cache.

The satellite position cache 333 is a data storage area (satellite position storage section) which stores the satellite position of each GPS satellite. FIG. 8 shows an example of the data configuration of the satellite position cache 333. As shown in FIG. 8, an area (data area) which stores the satellite position is formed in the satellite position cache 333 corresponding to each of 32 GPS satellites currently utilized (utilized in practice).

Figure 9:
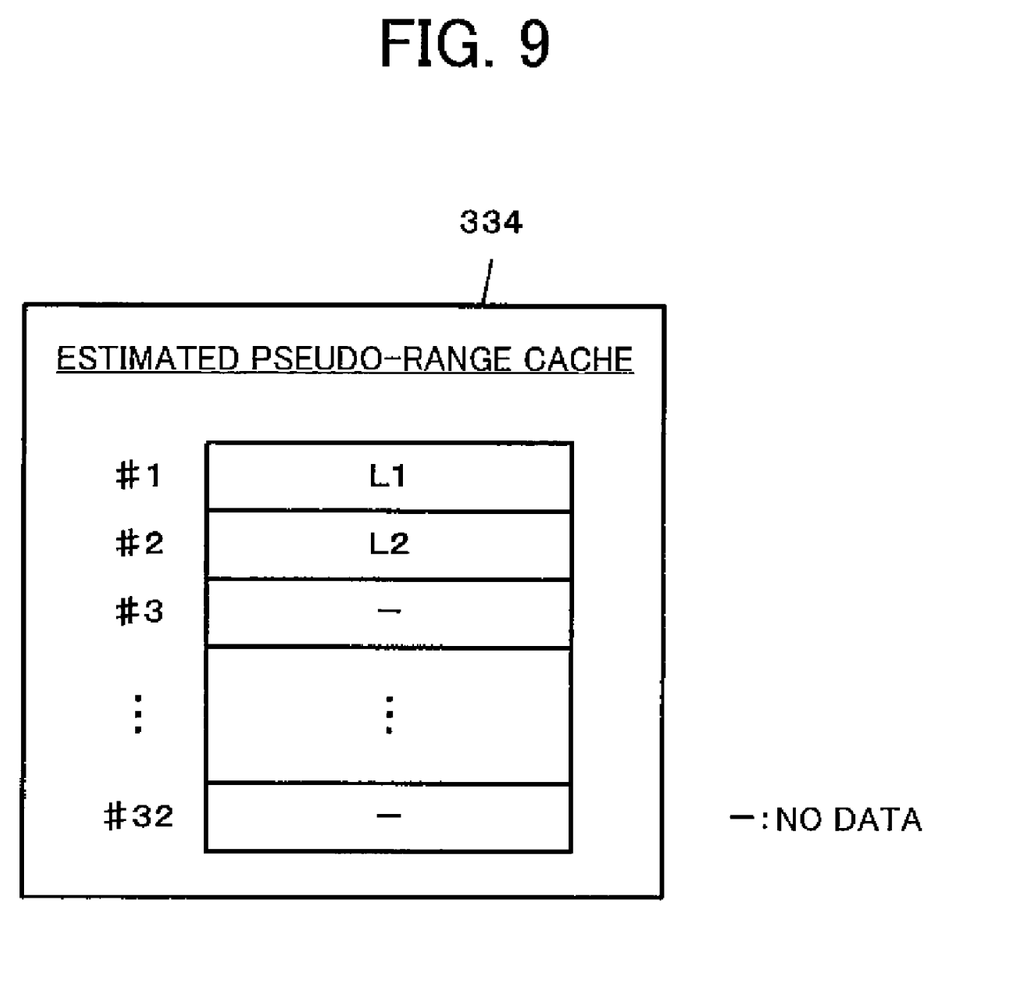
FIG. 9 shows a configuration example of an estimated pseudo-range cache.

The estimated pseudo-range cache 334 is a data storage area (estimated pseudo-range storage section) which stores the estimated pseudo-range of each GPS satellite. FIG. 9 shows an example of the data configuration of the estimated pseudo-range cache 334. As shown in FIG. 9, an area (data area) which stores the estimated pseudo-range is formed in the estimated pseudo-range cache 334 corresponding to each of 32 GPS satellites currently utilized.

The host CPU 40 controls each section of the portable telephone 1 based on various programs such as a system program stored in the ROM 43. Specifically, the host CPU 40 mainly implements a telephone call function, and performs a process for implementing various functions including a navigation function such as causing the display section 42 to display a navigation screen in which the present position of the portable telephone 1 input from the baseband process circuit section 30 is plotted on a map.

The operation section 41 is an input device including an operation key, a button switch, and the like. The operation section 41 outputs an operation signal corresponding to the operation of the user to the host CPU 40. Various instructions such as a positioning start/finish instruction are input by operating the operation section 41. The display section 42 is a display device such as a liquid crystal display (LCD). The display section 42 displays a display screen (e.g., navigation screen and time information) based on a display signal input from the host CPU 40.

The ROM 43 stores a system program which causes the host CPU 40 to control the portable telephone 1, a program and data necessary for implementing a navigation function, and the like. The RAM 44 is used as a work area for the host CPU 40. The RAM 44 temporarily stores a program and data read from the ROM 43, data input from the operation section 41, results of calculations performed by the host CPU 40 based on various programs, and the like.

The portable telephone antenna 50 is an antenna which transmits and receives a portable telephone radio signal between the portable telephone 1 and a radio base station installed by a communication service provider of the portable telephone 1. The portable telephone wireless communication circuit section 60 is a portable telephone communication circuit section which includes an RF conversion circuit, a baseband process circuit, and the like, and transmits and receives a radio signal under control of the host CPU 40.

Process Flow

Figure 10:
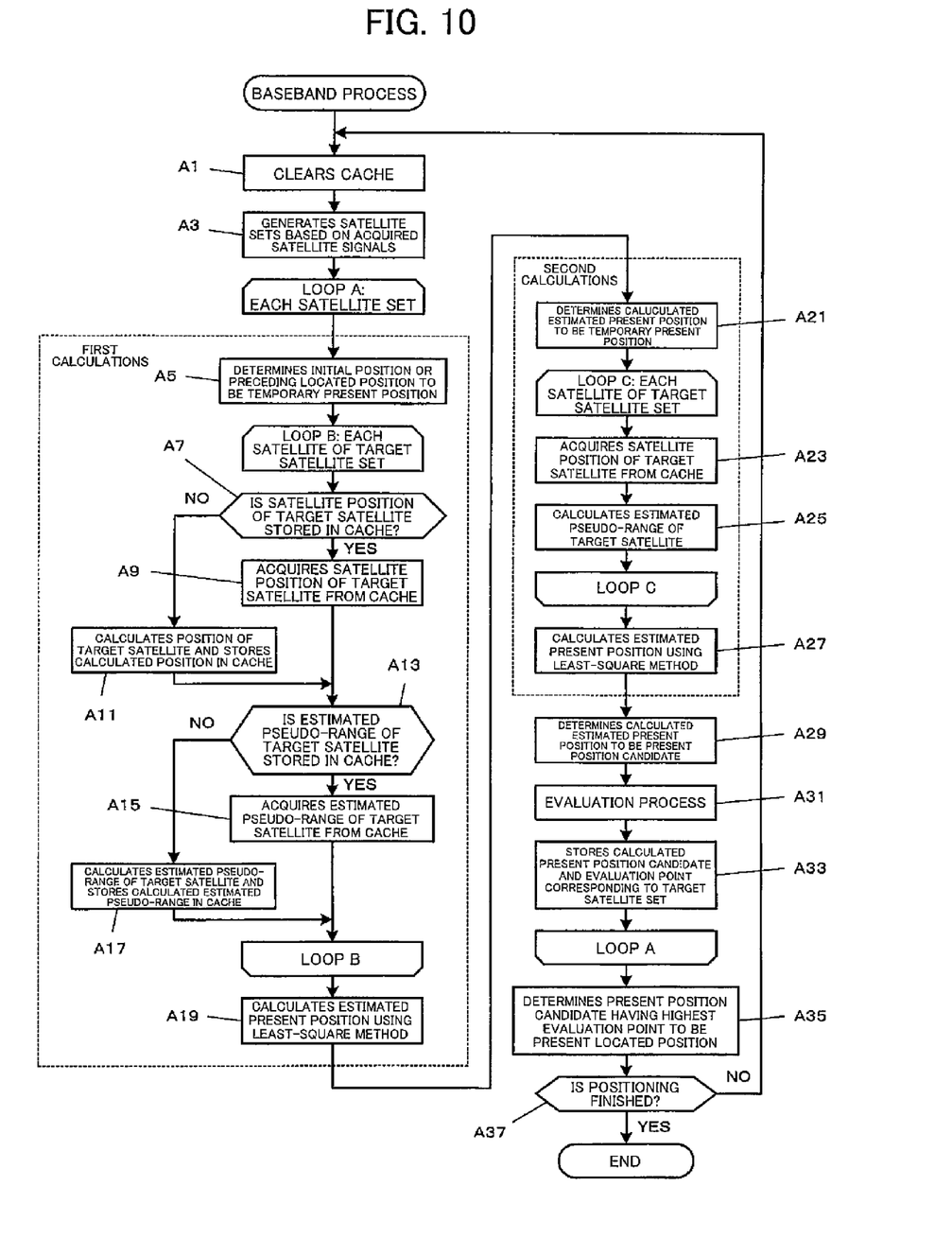
FIG. 10 is a flowchart of a baseband process.

FIG. 10 is a flowchart illustrative of the flow of the baseband process. The baseband process is implemented by causing the CPU 31 to execute the baseband process program 321. A digital IF signal obtained by down-converting an RF signal received by the GPS antenna 10 into an IF signal by the RF receiver circuit section 21 is input to the baseband process circuit section 30 at any time before the baseband process.

As shown in FIG. 10, the CPU 31 clears the satellite position cache 333 and the estimated pseudo-range cache 334 (step A1). The CPU 31 generates satellite sets made up of four or more GPS satellites based on the acquired satellite signals (step A3), and performs a loop A process on each satellite set generated.

In the loop A, the CPU 31 determines a given initial position or the preceding located position to be the temporary present position of the portable telephone 1 (step A5). The CPU 31 then performs a loop B process on each GPS satellite of the target satellite set.

In the loop B, the CPU 31 determines whether or not the satellite position of the target GPS satellite is stored in the satellite position cache 333. When the CPU 31 has determined that the satellite position of the target GPS satellite is stored in the satellite position cache 333 (step A7: YES), the CPU 31 acquires the position information relating to the target GPS satellite from the satellite position cache 333 (step A9). When the CPU 31 has determined that the satellite position of the target GPS satellite is not stored in the satellite position cache 333 (step A7: NO), the CPU 31 calculates the satellite position of the target GPS satellite based on the GPS satellite signal from the target GPS satellite, and stores the calculated satellite position in the satellite position cache 333 corresponding to the target GPS satellite (step A11).

The CPU 31 then determines whether or not the estimated pseudo-range of the target GPS satellite is stored in the estimated pseudo-range cache 334. When the CPU 31 has determined that the estimated pseudo-range of the target GPS satellite is stored in the estimated pseudo-range cache 334 (step A13: YES), the CPU 31 acquires the estimated pseudo-range of the target GPS satellite from the estimated pseudo-range cache 334 (step A15). When the CPU 31 has determined that the estimated pseudo-range of the target GPS satellite is not stored in the estimated pseudo-range cache 334 (step A13: NO), the CPU 31 calculates the estimated pseudo-range of the target GPS satellite and stores the calculated estimated pseudo-range in the estimated pseudo-range cache 334 corresponding to the target GPS satellite (step A17). The loop B is thus performed. The satellite position and the estimated pseudo-range of each GPS satellite of the target satellite are acquired by the loop B.

When the CPU 31 has performed the loop B process on all GPS satellites of the target satellite set, the CPU 31 performs position estimation calculations using a least-square method utilizing the temporary present position of the portable telephone 1 and the satellite position and the estimated pseudo-range of each GPS satellite as initial values to calculate the estimated present position of the portable telephone 1 corresponding to the target satellite set (step A19). The first position estimation calculations are thus performed.

The CPU 31 then performs the second position estimation calculations. The CPU 31 determines the present position candidate calculated by the first position estimation calculations to be the temporary present position of the portable telephone 1 (step A21). The CPU 31 then performs a loop C process on each GPS satellite of the target satellite set. In the loop C, the CPU 31 acquires the satellite position of the target GPS satellite from the satellite position cache 333 (step A23), and calculates the estimated pseudo-range of the target GPS satellite based on the acquired satellite position and the determined temporary present position (step A25). The loop C is thus performed. The satellite position and the estimated pseudo-range (information) of each GPS satellite of the target satellite are acquired by the loop C.

When the CPU 31 has performed the loop C process on all GPS satellites of the target satellite set, the CPU 31 performs estimation calculations using a least-square method utilizing the temporary present position of the portable telephone 1 and the satellite position and the estimated pseudo-range of each GPS satellite as initial values to calculate the estimated present position of the portable telephone 1 corresponding to the target satellite set (step A27). The second position estimation calculations are thus performed.

The CPU 31 determines the calculated estimated present position to be the present position candidate corresponding to the satellite set (step A29). The CPU 31 then performs an evaluation process which determines the evaluation point of the present position candidate calculated corresponding to the target satellite set using a PDOP or the like (step A31). The CPU 31 stores the calculated present position candidate and the evaluation point corresponding to the target satellite set (step A33). The loop A is thus performed.

When the CPU 31 has performed the loop A process on all satellite sets, the CPU 31 determines the present position candidate corresponding to the satellite set having the highest evaluation point to be the present located position (step A35). The CPU 31 then determines whether or not to finish positioning. When the CPU 31 has determined to continue positioning (step A37: NO), the CPU 31 returns to the step A1 and performs the next positioning. When the CPU 31 has determined to finish positioning (step A37: YES), the CPU 31 finishes the baseband process.

Effects

According to this embodiment, estimation calculations for calculating the estimated present position are performed twice corresponding to each satellite set, and the estimated present position calculated by the second estimation calculations is determined to be the present position candidate corresponding to the target satellite set. In the first estimation calculations performed corresponding to the first satellite set, the calculated satellite position of each GPS satellite is stored in the satellite position cache 333, and the calculated estimated pseudo-range of each GPS satellite is stored in the estimated pseudo-range cache 334. In the second estimation calculations, the satellite position of each GPS satellite is read from the satellite position cache 333. In the first estimation calculations performed corresponding to the second or subsequent satellite set, the satellite position of each GPS satellite is read from the satellite position cache 333, and the estimated pseudo-range of each GPS satellite is read from the estimated pseudo-range cache 334. The satellite position and the estimated pseudo-range of the GPS satellite of which the satellite position and the estimated pseudo-range have not been stored in the satellite position cache 333 and the estimated pseudo-range cache 334 are calculated and stored in the satellite position cache 333 and the estimated pseudo-range cache 334, respectively. In the second estimation calculations, the satellite position of each GPS satellite is read from the satellite position cache 333 in the same manner as for the first satellite set.

A single GPS satellite may be included in different satellite sets. In this case, the position of each GPS satellite is the same irrespective of the satellite set in which the GPS satellite is included. Therefore, if the calculated position of each GPS satellite is stored in the satellite position cache 333, the satellite position of the GPS satellite of which the satellite position has been calculated can be read from the satellite position cache 333 without again calculating the satellite position. The estimated pseudo-range of the GPS satellite is the same irrespective of the satellite set in which the GPS satellite is included insofar as the position of the GPS satellite and the temporary present position are the same. Specifically, since the preceding located position is used as the temporary present position in the first estimation calculations performed corresponding to each satellite set, the estimated pseudo-range of each GPS satellite is the same irrespective of the satellite set in which the GPS satellite is included. Therefore, if the calculated estimated pseudo-range of each GPS satellite is stored in the estimated pseudo-range cache 334, the estimated pseudo-range of the GPS satellite of which the estimated pseudo-range has been calculated can be read from the estimated pseudo-range cache 334 without again calculating the estimated pseudo-range. This eliminates a situation in which the same calculation is performed a plurality of times, whereby the number of calculations required for located position calculations can be reduced.

Modification

The application of the invention is not limited to the above embodiments. Various modifications and variations may be made without departing from the scope of the invention.

(A) Host CPU

For example, some or all of the processes performed by the CPU 31 of the baseband process circuit section 30 may be performed by the host CPU 40 by means of software.

(B) GPS Positioning Device

The above embodiments have been described taking the case of applying the GPS positioning device to a portable telephone. Note that the GPS positioning device may also be applied to other electronic instruments such as a portable navigation system, a car navigation system, a personal digital assistant (PDA), and a wristwatch.

(C) Satellite Positioning System

The above embodiments have been described taking the case of utilizing the GPS. Note that the invention may also be applied to other satellite positioning systems such as the global navigation satellite system (GLONASS).

(D) Storage Medium

A configuration may be employed in which the baseband process program 321 is recorded on a storage medium such as a CD-ROM and installed in an electronic instrument such as a portable telephone.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A positioning method comprising:
generating a plurality of satellite sets by combining four or more satellites that may include an identical satellite;
calculating position candidates of a located position based on each of the plurality of satellite sets; and
selecting a position candidate from the position candidates based on a given criterion, and determining the located position,
the calculating of the position candidates including
calculating a satellite position of a satellite, for which the satellite position is not stored in a first storage section, based on a satellite signal of the satellite, and storing the calculated satellite position in the first storage section,
reading a satellite position of a satellite, for which the satellite position is stored in the first storage section, from the first storage section,
calculating the estimated pseudo-range of a satellite, for which the estimated pseudo-range is not stored in a second storage section, using the satellite position of the satellite, and storing the calculated estimated pseudo-range in the second storage section, reading the estimated pseudo-range of a satellite, for which the estimated pseudo-range is stored in the second storage section, from the second storage section, and calculating the position candidates based on each of the plurality of satellite sets by performing given estimation calculations using the estimated pseudo-range of each satellite included in each of the plurality of satellite sets.

2. A positioning device comprising:

a satellite set generation section that generates a plurality of satellite sets by combining four or more satellites that may include an identical satellite;

a position candidate calculation section that calculates position candidates of a located position based on each of the plurality of satellite sets; and a position determination section that selects a position candidate from the position candidates based on a given criterion, and determines the located position, the position candidate calculation section calculating a satellite position of a satellite, for which the satellite position is not stored in a first storage section, based on a satellite signal of the satellite, storing the calculated satellite position in the first storage section, reading a satellite position of a satellite, for which the satellite position is stored in the first storage section, from the first storage section, calculating the estimated pseudo-range of a satellite, for which the estimated pseudo-range is not stored in a second storage section, using the satellite position of the satellite, and storing the calculated estimated pseudo-range in the second storage section, reading the estimated pseudo-range of a satellite, for which the estimated pseudo-range is stored in the second storage section, from the second storage section, and calculating the position candidates based on each of the plurality of satellite sets by performing given estimation calculations using the estimated pseudo-range of each satellite included in each of the plurality of satellite sets.

3. An electronic instrument comprising the positioning device as defined in claim 2.

* * * * *